United States Patent [19]
Ide

[11] Patent Number: 5,841,856
[45] Date of Patent: Nov. 24, 1998

[54] HANDS-FREE TELEPHONE SET

[75] Inventor: Yoshiyuki Ide, Tokyo, Japan

[73] Assignee: NEC Corporation, Japan

[21] Appl. No.: 861,382

[22] Filed: May 21, 1997

[30] Foreign Application Priority Data

May 22, 1996 [JP] Japan ................................. 8-126183

[51] Int. Cl.$^6$ .................................................. H04M 9/08
[52] U.S. Cl. ........................ 379/406; 379/399; 379/406; 379/410; 379/411; 364/724.19; 370/286; 455/553; 455/569; 455/570
[58] Field of Search ................................ 379/399, 410, 379/411, 406; 364/724.19; 370/286; 455/550, 553, 568, 569, 570, 573

[56] References Cited

U.S. PATENT DOCUMENTS

| | | |
|---|---|---|
| 4,605,826 | 8/1986 | Kanemasa . |
| 5,416,829 | 5/1995 | Umemoto ................................ 379/58 |

FOREIGN PATENT DOCUMENTS

| | | | |
|---|---|---|---|
| 3-16438 | 1/1991 | Japan | ............................... H04B 3/23 |
| 3-114344 | 5/1991 | Japan | ............................... H04M 1/60 |

*Primary Examiner*—Scott L. Weaver
*Assistant Examiner*—Shih-Wen Hsieh
*Attorney, Agent, or Firm*—Osterolenk, Faber, Gerb & Soffen, LLP

[57] ABSTRACT

A hands-free telephone set which is connected to both an analog cellular scheme line and a digital cellular scheme line includes first and second FIR filters. The first FIR filter is connected to a transmission path in an analog line connection state to cancel an acoustic echo generated when reception speech leaks to the transmission path. The second FIR filter is connected to a reception path in the analog line connection state, disconnected from the reception path, and cascaded to the first FIR filter in a digital line connection state. The second FIR filter constitutes a line echo canceler for canceling a line echo generated when transmission speech leaks to the reception path. In the digital line connection state, the cascaded first and second FIR filters constitute an acoustic echo canceler for canceling an acoustic echo generated when reception speech leaks to the transmission path.

9 Claims, 3 Drawing Sheets

HANDS-FREE TELEPHONE SET

BACKGROUND OF THE INVENTION

The present invention relates to a hands-free telephone set and, more particularly, to a hands-free telephone set which can be connected to both an analog cellular scheme line and a digital cellular scheme line.

In a conventional hand-free automobile telephone set, in order to prevent howling, the gain of the closed loop formed by acoustic coupling between the microphone and the speaker and crosstalk at the four-wire/two-wire converter in the switching unit (center station) connected to the subscriber line must be set to 1 or less. As a means for realizing such an operation, a voice switch scheme, an echo canceler scheme, and the like are available. The echo canceler scheme, which can provide excellent real-time speech communication services, will be described below.

This echo canceler scheme is disclosed, for example, in Japanese Patent Laid-Open Nos. 3-16438 and 3-114344. The hand-free telephone sets described in these references are designed to improve the speech communication quality by using echo cancelers.

In the analog cellular scheme, line echoes are generated by the four-wire/two-wire converter in the switching unit (center station) connected to the subscriber line, and acoustic echoes are generated when reception speech leaks from the reception speaker to the transmission microphone. These two types of echoes must therefore be eliminated.

In the digital cellular scheme, since a line echo canceler is provided at the base station, no line echo is generated at the automobile telephone set. However, acoustic echoes in this scheme must be eliminated to a greater degree than in the analog cellular scheme. This is because in the digital cellular scheme, a signal is processed by a speech coder for performing analog/digital conversion, and hence a large transmission delay occurs at a line. For this reason, the user clearly perceives an echo. In the analog cellular scheme with little transmission delay, echoes are masked by transmission speech and are barely recognized.

The following are the problems posed in the above prior art.

Assume that an automobile telephone set which is operable in both an analog and digital cellular mode includes two independent echo cancelers for eliminating line and acoustic echoes. In this case, calculation is performed more than that which is necessary for each cellular scheme.

This is because the amount of acoustic echoes to be eliminated differ in the two schemes, and no line echoes need be eliminated in the digital cellular scheme. In the digital cellular scheme, since the transmission delay at a line is large, the user clearly perceives an echo effect. In the analog cellular scheme, however, the transmission delay at a line is small. For this reason, in order to eliminate acoustic echoes in the digital cellular scheme, an Finite Impulse Response (FIR) filter in the acoustic echo canceler requires more taps than in the analog cellular scheme. With this arrangement, when the telephone set is switched to the analog cellular scheme, calculations must be performed more than necessary to eliminate acoustic echoes.

In the analog cellular scheme, line echoes generated by the four-wire/two-wire converter in the switching unit (center station) connected to the subscriber line must be eliminated. In contrast, in the digital cellular scheme, since an echo canceler for eliminating line echoes is arranged on the base station side, no echo canceler for eliminating line echoes need be arranged in the automobile telephone set. For these reasons, the two echo cancelers cannot be efficiently used.

SUMMARY OF THE INVENTION

It is an object of the present invention to provide a hand-free telephone set which can efficiently use an acoustic echo canceler.

In order to achieve the above object, according to the present invention, there is provided a hands-free telephone set having a transmission path and a reception path, said telephone set being operable in.

DESCRIPTION OF THE PREFERRED EMBODIMENT

The present invention will be described in detail next with reference to the accompanying drawings.

Figure 1:
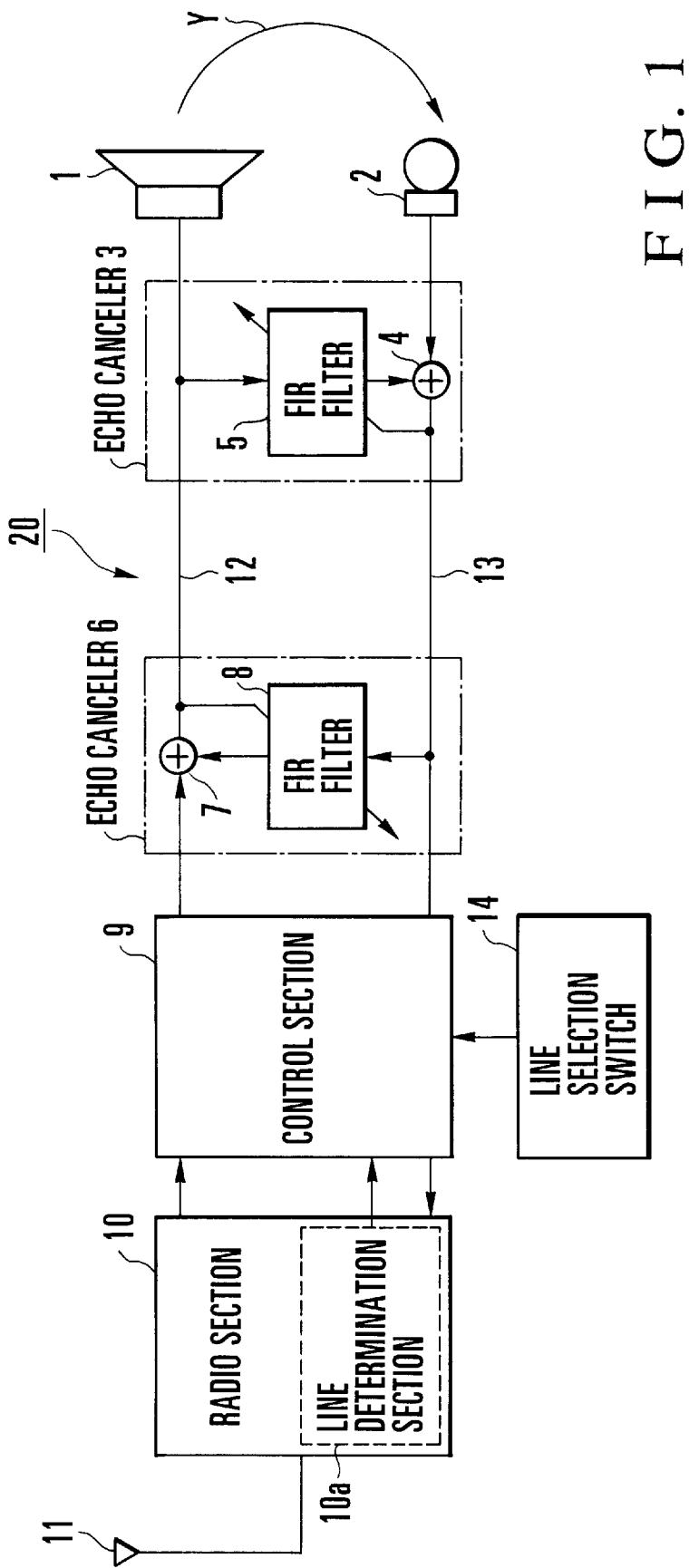
FIG. 1 is a block diagram showing the arrangement of a hands-free telephone set according to an embodiment of the present invention, wherein the telephone set is operating in an analog cellular mode.

FIG. 1 shows the arrangement of a hands-free telephone set according to one embodiment of the present invention, wherein the telephone set is operating in the analog cellular mode. The hands-free telephone set 20 comprises an antenna 11 for transmitting/receiving signals to/from a base station, a radio section 10 for outputting a transmission signal to the antenna 11 and receiving a reception signal from the antenna 11, a control section 9 for performing control of relay switches (to be described below) and the like, and a line selection switch 14 connected to the control section 9 to select an analog or digital cellular mode to be used to transmit a signal from the hand-free telephone set 20 in a transmitting operation. The radio section 10 includes a line determination section 10a for determining, on the basis of a reception signal in a receiving operation, whether the hands-free telephone set 20 is receiving an analog or a digital cellular signal, and outputting the determined result.

The hands-free telephone set 20 further comprises a reception speaker 1 for converting an electrical signal corresponding to a reception signal into speech, and outputting it, a transmission microphone 2 for converting transmission speech into an electrical signal and inputting it, an echo canceler 6 inserted in a reception path 12 to cancel line echoes generated on the line side, and an echo canceler 3 inserted in a transmission path 13 to cancel acoustic echoes generated when reception speech output from the reception speaker 1 leaks to the transmission microphone 2.

The echo canceler 6 comprises an FIR filter 8 for estimating a line echo on the reception path 12, and an adder 7 for inverting an output from the FIR filter 8 and adding it to the reception path 12. The echo canceler 3 comprises an FIR filter 5 for estimating an echo on the transmission path 13, and an adder 4 for inverting an output from the FIR filter 5 and adding it to the transmission path 13.

According to this arrangement, line and acoustic echoes can be canceled by the echo canceler 6 and the echo canceler 3. With this operation, good speech communication quality can be obtained when analog line connection is made.

Figure 2:
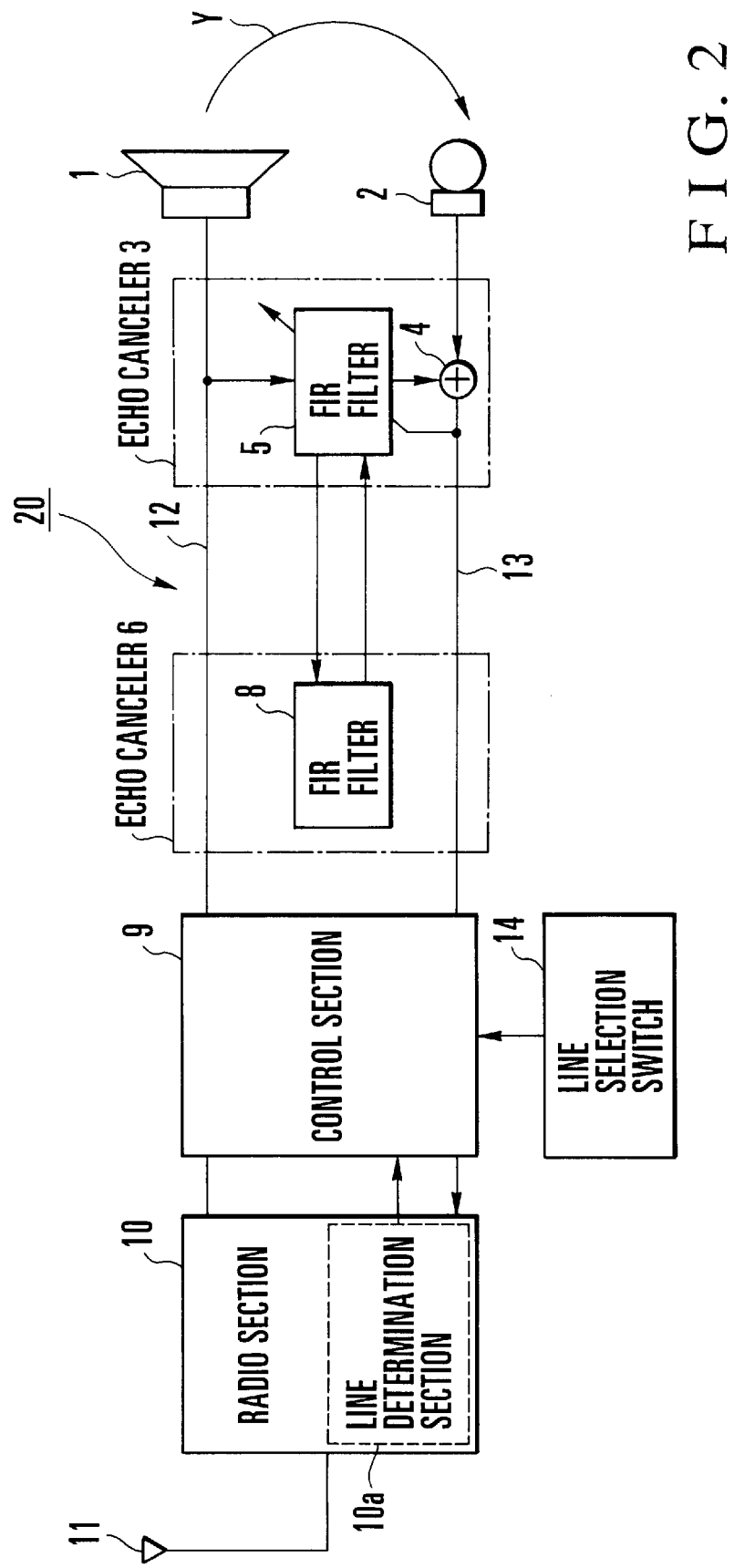
FIG. 2 is a block diagram showing the arrangement of the hands-free telephone set according to the embodiment of FIG. 1, wherein the telephone set is operating in a digital cellular mode.

FIG. 2 shows the hands-free telephone set of FIG. 1 when operated in the digital cellular mode. The same reference numerals in FIG. 2 denote the same parts as in FIG. 1. In this mode, the FIR filter 8 in the echo canceler 6 is cascaded to the FIR filter 5 in the echo canceler 3 for canceling acoustic echoes, unlike in the connection state shown in FIG. 1.

According to this arrangement, acoustic echoes can be canceled by increasing the calculation amount at the FIR filter portion. With this operation, acoustic echoes can be effectively canceled in the digital line connection state, thereby obtaining good speech communication quality. As described above, in the digital cellular mode, since the echo canceler for eliminating line echoes is arranged in the base station, line echoes can be eliminated by the echo canceler in the base station.

Figure 3:
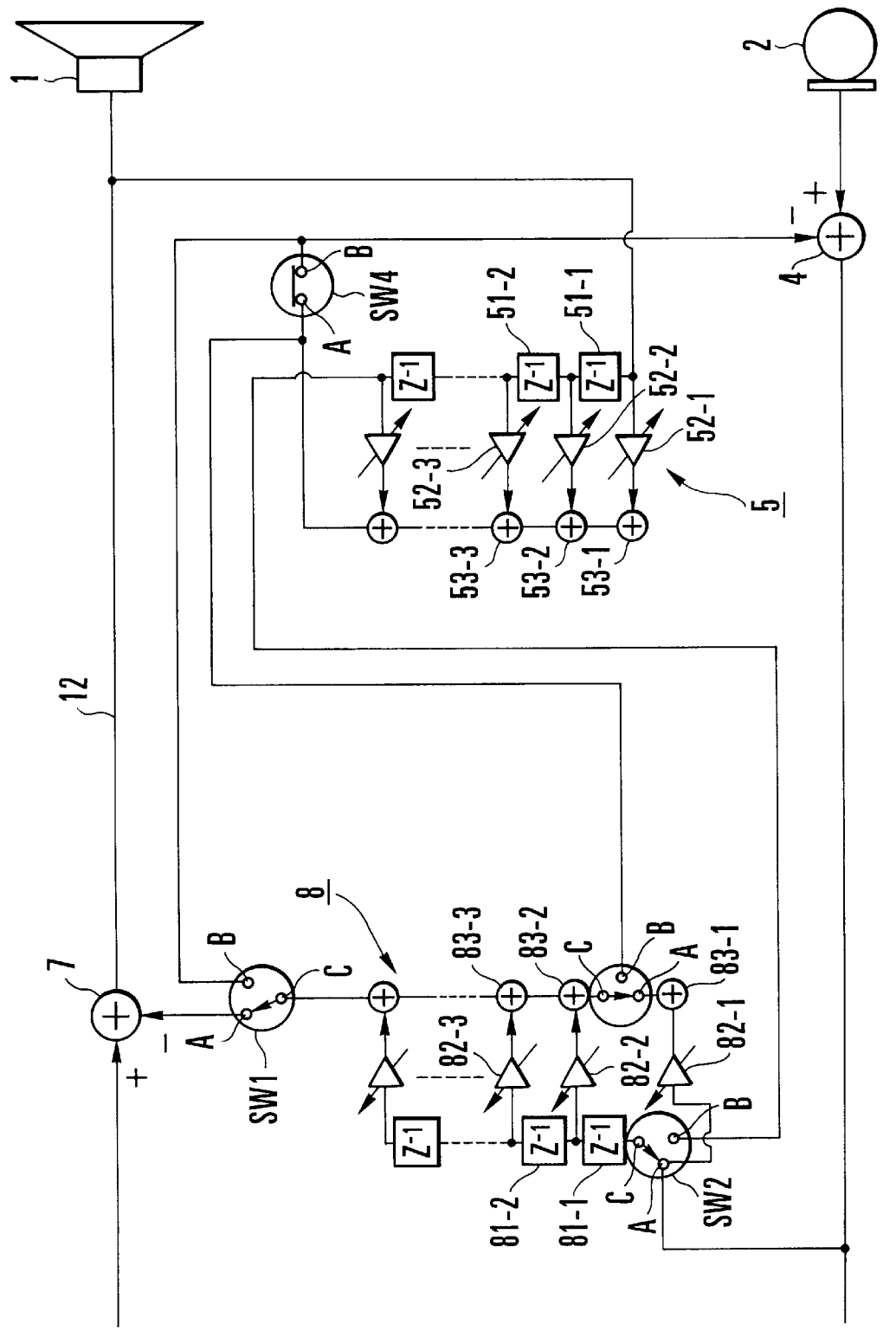
FIG. 3 is block diagram showing the connection arrangement of two FIR filters in the hands-free telephone set of FIGS. 1 and 2.

The connection state of the FIR filters in FIGS. 1 and 2 will be described next. FIG. 3 shows examples of the inner arrangements of the FIR filters 5 and 8 in FIGS. 1 and 2. The same reference numerals in FIG. 3 denote the same parts as in FIGS. 1 and 2.

Referring to FIG. 3, the FIR filter 5 includes a plurality of cascaded delay circuits ($Z^{-1}$) 51-1, 51-2, . . . , a plurality of multipliers 52-1, 52-2, . . . , for multiplying the delay outputs from the delay circuits 51-1, 51-2, . . . by predetermined coefficients, and a plurality of adders 53-1, 52-2, . . . for sequentially adding the outputs from the multipliers 52-1, 52-2, . . . . The FIR filter 8 includes a plurality of cascaded delay circuits ($Z^{-1}$) 81-1, 81-2, . . . , a plurality of multipliers 82-1, 82-2, . . . , for multiplying the delay outputs from the delay circuits 81-1, 81-2, . . . by predetermined coefficients, and a plurality of adders 83-1, 83-2, . . . for sequentially adding the outputs from the multipliers 82-1, 82-2, . . . .

In addition, relay switches (to be referred to as switches hereinafter) SW1 to SW4 which are controlled by the control section 9 are arranged to selectively realize the above connection states in FIGS. 1 and 2. The switch SW1 includes a terminal A connected to the adder 7, a terminal B connected to the adder 4, and a common terminal C connected to the last adder of the FIR filter 8. The switch SW2 includes a terminal A connected to the transmission path 13 and the first multiplier 82-1 of the FIR filter 8, a terminal B connected to the FIR filter 5, and a common terminal C connected to the last delay circuit of the FIR filter 8. The switch SW3 includes a terminal A connected to the first adder 83-1 of the FIR filter 8, a terminal B connected to the last adder of the FIR filter 5, and a common terminal C connected to the second adder 83-2 of the FIR filter 8. The switch SW4 includes a terminal A connected to the last adder of the FIR filter 5 and a terminal B connected to the adder 4.

When the hands-free telephone set 20 is operated in analog cellular mode, the common terminals C of the switches SW1 to SW3 connected in this manner are connected to the terminals A. When the hands-free telephone set 20 is operated in the digital cellular mode, the common terminals C are connected to the terminals B. When the hands-free telephone set 20 is operated in the analog cellular mode, the terminal A of the switch SW4 is connected to the terminal B (ON state). When the hands-free telephone set 20 is operated in the digital cellular mode, the terminal A of the switch SW4 is disconnected from the terminal B (OFF state).

With this control, when the hands-free telephone set 20 is operated in the analog cellular mode, the respective switches SW1 to SW4 are set in the state shown in FIG. 3. In this state, since the common terminals C of the switches SW1 to SW3 are connected to the terminals A, the FIR filter 8 is disconnected from the FIR filter 5 and connected between the adder 7 and the transmission path 13. At this time, the circuit shown in FIG. 1 is formed. As described with reference to FIG. 1, therefore, line echoes on the reception path 12 are estimated by the FIR filter 8, and the estimation result is inverted and supplied to the adder 7. As a result, the line echoes are canceled.

In this state, the switch SW4 is in the ON state. For this reason, the FIR filter 5 is connected between the reception path 12 and the adder 4. At this time, the circuit shown in FIG. 2 is formed. As described with reference to FIG. 2, therefore, acoustic echoes on the transmission path 13 are estimated by the FIR filter 5, and the estimation result is inverted and supplied to the adder 4. As a result, the acoustic echoes are canceled.

Note that the coefficients to be multiplied by the delay outputs from the respective delay circuits are calculated by using a signal on the reception path 12 or the transmission path 13. More specifically, in the FIR filter 8, the coefficients are calculated by using a signal on the reception path 12, and the coefficients are variably controlled in accordance with changes in the signal on the reception path 12. In the FIR filter 5, the coefficients are calculated by using a signal on the transmission path 13, and the coefficients are variably controlled in accordance with changes in the signal on the transmission path 13.

When the hands-free telephone set 20 is operated in the digital cellular mode, the common terminals C of the switches SW1 to SW3 are connected to the terminals B, and the switch SW4 is set in the OFF state. In this state, the last stage of the FIR filter 5 is connected to the first stage of the FIR filter 8. That is, the FIR filter 8 is disconnected from the adder 7 and the transmission path 13, and the second adder 83-2 and first delay circuit 81-1 of the FIR filter 8 are respectively connected to the last adder and delay circuit of the FIR filter 5. With this operation, the FIR filters 5 and 8 are cascaded to each other, and the tap length of the filter increases. As a result, the amount of calculation for estimation of acoustic echoes increases, and hence the acoustic echoes can be reliably canceled.

The coefficients to be multiplied by the delay outputs from the respective delay circuits when the hands-free telephone set 20 is operated in the digital cellular mode are calculated by using a signal on the transmission path 13, and are variably controlled in accordance with changes in the signal on the transmission path 13, as shown in FIG. 2.

A control signal for switching control and ON/OFF control on the switches SW1 to SW4 is output from the control section 9 in accordance with the determination result obtained by the line determination section 10a of the radio section 10 when the section 10a determines, upon reception of a reception signal (from another telephone set), whether the signal is an analog or digital signal. In addition, when a transmission signal is to be sent (to another telephone set), a control signal is generated on the basis of an output from the line selection switch 14 which is manually operated to select the analog or digital line.

As is apparent, the switches SW1 to SW4 can be realized by using switches other than the relay switches.

The above embodiment has exemplified the automobile telephone set. As is apparent, however, the present invention is not limited to the automobile telephone set, and can be applied to general mobile telephone sets capable of hands-free speech communication. In addition, it is obvious that the present invention can be applied to schemes other than the digital cellular scheme as long as an echo canceler for eliminating line echoes is arranged on the base station side.

As has been described above, according to the present invention, when the telephone set is operated in the analog cellular mode, the two echo cancelers independently operate to cancel both line and acoustic echoes. When the telephone set is operated in the digital cellular mode, the two echo cancelers are cascaded to each other to increase the tap length of the FIR filter so as to eliminate echoes generated by transmission delays on the digital line. In either mode of operation, stable speech communication can be realized without howling and an echo effect.

What is claimed is:

1. A hands-free telephone set having a transmission path and a reception path, said telephone set being operable in both an analog cellular and a digital cellular mode, said telephone set comprising:

a first Finite Impulse Response (FIR) filter which is connected to said transmission path to cancel an acoustic echo generated when reception speech leaks to said transmission path; and a second FIR filter which is connected to said reception path when said telephone set is operated in said analog cellular mode to cancel a line echo generated when transmission speech leaks to said reception path, said second FIR filter being disconnected from said reception path and cascaded to said first FIR filter when said telephone set is operated in said digital cellular mode so that said cascaded first and second FIR filters cancel an acoustic echo generated when reception speech leaks to the transmission path.

2. A telephone set according to claim 1, wherein said first FIR filter estimates an acoustic echo on said transmission path, and said second FIR filter estimates a line echo on said reception path, when said telephone set is operated in said analog cellular mode, and said cascaded first and second FIR filters estimate an acoustic echo on the transmission path when said telephone set is operated in said digital cellular mode.

3. A telephone set according to claim 1, further comprising:

a first adder inserted in said transmission path;

a second adder inserted in said reception path;

a switching circuit for inputting an inverted output from said second FIR filter to said second adder when said telephone set is operated in said analog cellular mode, and disconnecting said second FIR filter from said second adder and cascading said second FIR filter to said first FIR filter, when said telephone set is operated in said digital cellular mode, so as to input an inverted output from said cascaded first and second FIR filters to said first adder.

4. A telephone set according to claim 3, wherein said switching circuit comprises:

a first switch for connecting an output of said second FIR filter to one of said second and first adders;

second and third switches for connecting an input stage of said second FIR filter to one of the transmission path and an output stage of said first FIR filter; and a fourth switch for ON/OFF-controlling connection between an output of said first FIR filter and said first adder.

5. A telephone set according to claim 3, further comprising mode determination means for determining the mode of operation of said telephone set depending on whether a signal received by said telephone set is an analog or digital cellular signal, so that an operation of said switching circuit is controlled in accordance with the determination result obtained by said mode determination means.

6. A telephone set according to claim 3, further comprising mode selection means which is manually operated to select one of said analog and digital cellular modes, so that an operation of said switch means is controlled in accordance with an output from said mode selection means.

7. A telephone set according to claim 3, further comprising control means for controlling said switching circuit to operate said telephone set in said analog or digital cellular mode.

8. A hands-free telephone set which operable in both an analog and a digital cellular mode, comprising:

a first Finite Impulse Response (FIR) filter for estimating an acoustic echo on a transmission path when said telephone set is operated in an analog cellular mode;

a first adder for inverting said acoustic echo estimated by said first FIR filter and adding said inverted echo to a transmission signal on said transmission path, said first FIR filter and said first adder constituting an acoustic echo canceler for canceling an acoustic echo generated when reception speech leaks to said transmission path;

a second FIR filter for estimating a line echo on a reception path when said telephone set is operated in said analog cellular mode;

a second adder for inverting said line echo estimated by said second FIR filter and adding said inverted echo to a reception signal on said reception path, said second FIR filter and said second adder constituting a line echo canceler for canceling a line echo generated when transmission speech leaks to said reception path; and switch means inputting an inverted output from said second FIR filter to said second adder when said telephone set is operated in said analog cellular mode, and disconnecting said second FIR filter from said second adder and cascading said second FIR filter to said FIR filter when said telephone set is operated in said digital cellular mode, so as to input an inverted output from said cascaded first and second FIR filters to said first adder, wherein when said telephone set is operated in said digital cellular mode, said second adder and said cascaded first and second FIR filters constitute an acoustic echo canceler for canceling an acoustic echo generated when reception speech leaks to said transmission path.

9. A telephone set according to claim 8, further comprising:

mode determination means for determining a type of line connection, in a terminating operation, depending on whether a signal received by said telephone set is an analog or digital cellular signal;

mode selection means manually operated to select one of said analog and digital cellular modes; and control means for controlling said switch means in accordance with outputs from said mode determination means and said mode selection means.

* * * * *